United States Patent [19]

Lee et al.

[11] Patent Number: 5,712,442
[45] Date of Patent: Jan. 27, 1998

[54] METHOD FOR LAUNCHING PROJECTILES WITH HYDROGEN GAS

[75] Inventors: Woodrow W. Lee, Potomac; Richard D. Ford, Silver Spring, both of Md.

[73] Assignee: The United States of America as represented by the Secretary of the Navy, Washington, D.C.

[21] Appl. No.: 199,879

[22] Filed: May 27, 1988

[51] Int. Cl.$^6$ ..................................................... F41F 1/00
[52] U.S. Cl. ................................................................ 89/8
[58] Field of Search ........................... 73/147; 89/7, 8; 102/440

[56] References Cited

U.S. PATENT DOCUMENTS

| | | | |
|---|---|---|---|
| 2,899,864 | 8/1959 | Bloxsom | 89/7 |
| 2,995,035 | 8/1961 | Bloxsom et al. | 73/147 |
| 3,267,720 | 8/1966 | Escallier et al. | 73/147 |
| 3,479,857 | 11/1969 | Bloxsom et al. | 73/147 |
| 4,913,029 | 4/1990 | Tidman et al. | 89/8 |
| 4,974,487 | 12/1990 | Goldstein et al. | 89/7 |
| 5,012,719 | 5/1991 | Goldstein et al. | 89/8 |

FOREIGN PATENT DOCUMENTS 849535  9/1960  United Kingdom ..................... 73/147

OTHER PUBLICATIONS

Scherrer, Victor E., "An Exploding Wire Hypervelocity Projector", Exploding Wires, vol. II, ed. Chace et al, 1962, pp. 235–244.
Investigation of the Reaction of Aluminum–Lithium Alloy with Water by the Exploding Wire Technique, NSWC TR 86–78, by Drs. Woodrow Lee and Richard Ford. Distributed Jun. 2, 1987.

*Primary Examiner*—Michael J. Carone
*Assistant Examiner*—Christopher K. Montgomery
*Attorney, Agent, or Firm*—John Forrest; Roger D. Johnson

[57] ABSTRACT

A method for propelling a projectile by applying a high power pulse of electrical current to a metal fuel element (of Al, Al—Li, or Al—Mg) causing the element to explode dispersing molten metal fuel into water with which it reacts to rapidly generate hydrogen gas at high pressure; the hydrogen gas is used to push the projectile. After the peak current is reached, an inductive electrical energy source drives the electrical current into the molten metal fuel/water mixture thus driving the reaction to completion.

12 Claims, 1 Drawing Sheet

METHOD FOR LAUNCHING PROJECTILES WITH HYDROGEN GAS

This invention relates to methods of generating gases and more particularly to methods of generating hydrogen gas.

BACKGROUND OF THE INVENTION

Acceleration of projectiles launched from gun, rocket, and missile systems is limited by the sonic velocity of gas products from propellants. Conventional gun propellants (nitrocellulose) generate heavy gases like carbon dioxide, carbon monoxide, nitrogen oxide, and water vapor whose sonic velocity seldom exceeds 500 m/sec at ambient temperature. The maximum speed of projectiles launched from gun barrel by such gases barely reaches 1 km/sec.

Hydrogen gas which outspeeds any other gases (under same pressure and temperature), owing to its low molecular weight, is an ideal fluid to impart its kinetic energy efficiently to a projectile. For this reason hydrogen gas is used in a two-stage gas gun (1) that launches a projectile to hypervelocity (over 6 km/sec). This type of gun is operated by a two step process. In the first stage, gun powder charge is ignited to drive a piston against hydrogen gas stored in a gas reservoir. In the next stage, the rise of hydrogen gas pressure due to the compression eventually actuates a valve mechanism at the base of the launch barrel and pressurized hydrogen is released to push a projectile. Besides this multi-staged pressurization, the whole operation of the device also includes storing of the gas nearby and mechanisms for its transfer to the reservoir. Although the staged gas gun routinely increases the projectile velocity up to 7 km/sec, the complexity of the operation makes it cumbersome and impractical for routine uses.

Hydrogen gas can be generated chemically in such reactions as decomposition of metal hydrides or oxidation of metal like aluminum by water. When metal hydride is mixed with a certain metal oxide, the decomposition of the hydride is greatly accelerated and the overall reaction accompanies a net energy gain. However, the amount of heat and gas generated per unit mass or volume of the reactants in the decomposition is not clearly advantageous over conventional propellants. Energetically, the reaction of aluminum with water is more favorable than combustion of the propellants. However, due to the formulation of passive oxide film on the metal surface, the oxidation reaction is never sustained unless the temperature of the metal is raised above the melting point of its oxide. Therefore, such metallic systems need to be activated energetically in order to generate hydrogen gas which is clearly more energetic than the gases from the conventional propellants, or to complete the hydrogen generating reaction.

The use of electrical energy for hypervelocity acceleration has been made in the devices called electro-thermal (ET) guns. There are two versions currently being developed, but neither version is aimed at generating hydrogen gas primarily.

The first version, first developed by G. T. Devices, uses electrical energy for a brute vaporization of solid materials without any chemical enhancement. In this device, electrical energy is used to vaporize a thin aluminum wire and initiate a plasma discharge within a thin capillary chamber whose walls are made of polyethylene. Continuing energy input produces a high temperature hydro-carbon plasma which is injected into a conventional gun chamber to push projectile. Since plasma of this temperature would quickly damage gun bore, it is moderated by adding water so that the pusher gas becomes high temperature steam or its plasma. Obviously, some water dissociates to produce hydrogen gas. However, the gun does not claim to be hydrogen propelled and acceleration over 2.5 kM/sec is difficult to achieve.

The other version is a variation of the first device just described. This device (FMC Corp., proprietary process) does claim chemical enhancement. However, in this device, electrical energy is applied to conventional propellants or pyrotechnique materials. Thus, the product gases have high molecular weight and acceleration over 1 kM/sec is difficult to achieve.

SUMMARY OF THE INVENTION

Accordingly, an object of this invention is to provide a method of rapidly generating hydrogen gas.

Another object of this invention is to provide a method of launching projectiles at very high velocities.

A further object of this invention is to provide a simple method of lauching projectiles at high velocities with hydrogen gas.

Yet another object of this invention is to provide simple, compact apparatus for launching projectiles using hydrogen gas.

These and other objects of this invention are accomplished by providing a method of propelling a projectile from a device by (1) applying a high power pulse of electrical current to a metal fuel element causing the element to explode dispersing molten metal fuel into water surrounding the metal fuel element where the molten metal reacts with the water to generate hydrogen at high pressure in a chamber, wherein (a) the metal fuel is (i) aluminum, (ii) an aluminum-lithium alloy comprising from more than zero to 3.0 weight percent of lithium with the remainder of the alloy being essentially aluminum, or (iii) an aluminum-magnesium alloy comprising from more than zero to 5.0 weight percent of magnesium with the remainder of the alloy being essentially aluminum;

and wherein (b) after the metal fuel has become molten, electrical current is supplied from an inductive electrical energy source to drive the reaction between the molten metal fuel and the water;

(2) allowing the hydrogen gas pressure in the chamber to build to a preselected level; and then (3) using the hydrogen gas to push the projectile from the device.

BRIEF DESCRIPTION OF THE DRAWINGS

A more complete appreciation of this invention and many of the attendant advantages thereof will be readily appreciated as the same becomes better understood by reference to the following detailed description when considered in conjunction with the accompanying drawings in which like numbers indicate the same or similar components, wherein.

DETAILED DESCRIPTION OF THE PREFERRED EMBODIMENT

Figure 1:
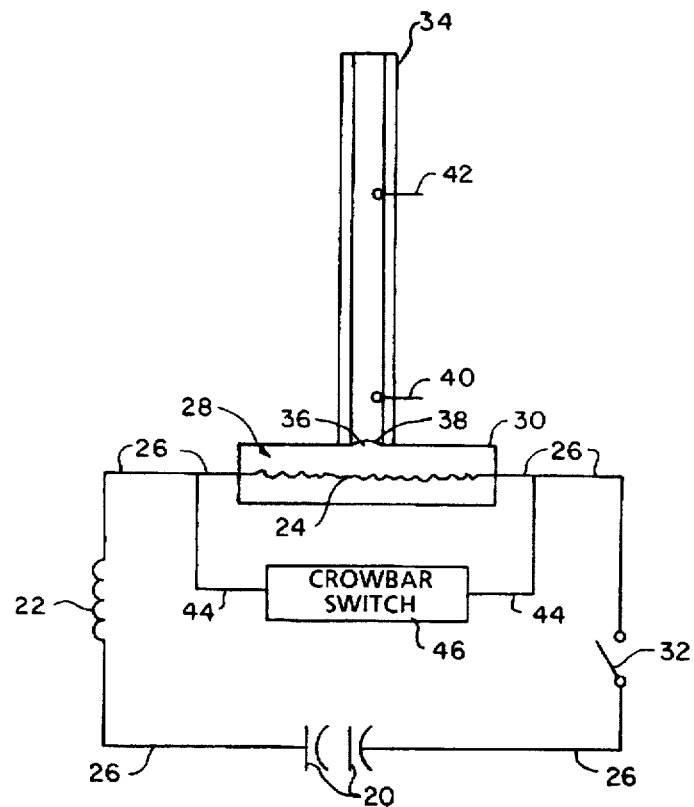
FIG. 1 is a schematic representing equipment used to test and demonstrate the generation of high pressure hydrogen gas to propel projectiles according to the present invention.

This invention rapidly generates hydrogen gas by applying pulse power techniques to metallic fuel/oxidizer systems and then utilizes the hydrogen gas to launch projectiles. Examples of the metal fuel/oxidizer systems which can be used are

| metal fuel | oxidizer |
| --- | --- |
| aluminum | water |
| aluminum-lithium alloy | water |
| aluminum-magnesium alloy | water |

The metal fuel in each system undergoes complete a combustion reaction with the oxidizer (water); high temperature hydrogen gas is produced. When such a metallic system is subject to a high power electrical pulse, the complete combustion reaction of the metal fuel with water is ensured. Additionally, the energy content of the system is greatly reinforced by the electrical energy. Such enhancement in energy can raise the temperature and pressure of the hydrogen gas to much high value than a chemical reaction alone can provide. Electrically activated combustion of metallic materials also displays some advantageous features such as increase in the reaction rate and controllability of the rate.

The metal fuel is formed into a conductive element which has a low resistance at low currents but which heats up and explodes when a high energy electrical current is applied to it. Ideally, the conductor should not have any significant increase of its electrical resistance until the peak current time. But when the peak current is reached, the metal should start to explode to dissipate the electrical energy as quick as possible. Such condition is met if the conductor becomes a molten state of high temperature by the time of the peak current. The exploding metal fuel element disperses into and chemically reacts with the water which surrounds it to produce hydrogen at a high temperature and pressure. Preferred shapes for the metal fuel element include wires and foils. A wire shape more uniformly distributes the high energy current through the metal fuel. On the other hand, the foils provide greater surface contact between the metal fuel and the water at the time of the explosion. Also the length of the metal fuel element should be taken into consideration. As the voltage across the conductor rises during explosion, there is an increasing possibility of an electrical arc bypassing the conductor. Since the probability of the arcing depends on the conductor length, there should be a minimum length requirement. It was found that a conductor of approximately 15 cm long can withstand a voltage rise up to 30 kV. For higher voltages the length of the metal fuel element will be increased accordingly.

The metal fuel materials which are used include aluminum metal, aluminum-lithium alloys, and aluminum-magnesium alloys. The aluminum-lithium alloys contain from more than zero to 3.0, preferably from 2.0 to 3.0, more preferably from 2.0 to 2.8, and still more preferably from 2.5 to 2.8 weight percent of lithium, with the remainder of the alloy consisting essentially of aluminum. As the amount of lithium added to the aluminum is increased, the amount of electrical energy required to cause the complete reaction between the metal fuel and water is decreased. Thus 10 joules is required per gram of aluminum, about 7 joules per gram of Al—Li alloy containing 1.5 weight percent lithium, and only 4 joules per gram of Al—Li alloy containing 2.5 weight percent of lithium. A minimum of 2.0 percent lithium is used to substantially improve the performance of the Al-Li alloy over aluminum. At least 2.5 percent of lithium is used to produce the best results. The upper limit of lithium is preferably 2.8 weight percent above which Al—Li intermetallic compounds precipitate and the strength of the lithium-aluminum alloys decrease accordingly. If more than 3.0 weight percent of lithium is used, the alloys become too brittle for use in this invention.

Similarly, magnesium may be added to the aluminum to form alloys which require less electrical energy to totally react with water than aluminum alone. Aluminum-magnesium alloys containing from more than zero to 5.0 and more preferably from 3.0 to 4.5 weight weight percent of magnesium with the remainder of the alloy consisting essentially of aluminum can be used. If more than 5.0 weight percent of magnesium is used, the aluminum-magnesium alloy will be too brittle to be used in this invention.

The stoichometric amount of water which will react with the aluminum, aluminum-lithium alloy, or aluminum magnesium alloy is calculated according to the following equations:

(1) $2Al + 6H_2O \rightarrow 2Al(OH)_3 + 3H_2$
(2) $Mg + 2H_2O \rightarrow 2Mg(OH)_2 + H_2$
(3) $2Li + 2H_2O \rightarrow 2LiOH + H_2$ Generally slightly more water than stoichiometric amount is used. Preferably from 100 to 1000, and more preferably from 150 to 300 percent of the stoichiometric amount of water is used.

The chemical interaction between exploding aluminum and the surrounding water critically depends on the mode of electrical energy discharge through the metal conductor. An inductive energy store provides an ideal power source for such discharge since its discharge is not limited by the voltage rise across the exploding conductor. For example, a capacitor bank discharge may not discharge all of its stored charge through the conductor because the voltage rise across the exploding conductor could exceed the bank voltage thereby terminating the discharge. In addition to the voltage aspect, the power source should also allow a very high current to pass through the conductor at the moment of its explosion to deliver a high electrical energy to the metal conductor in a very short time.

Discharge of an inductive energy store can fulfill the two conditions mentioned above. The essence of this type of discharge is to transform an electrical energy stored in a battery, electrical rotating (homopolar) generator, capacitor bank, or other primary electrical power source to an energy stored in an inductor and to utilize the inductive energy at the moment of the explosion. For experimental simplicity, a capacitor bank is often used. When a capacitor bank whose energy is $\frac{1}{2} CV^2$ is discharged through a RCL circuit, the primary bank energy is transformed into an inductive energy described by $\frac{1}{2} LI_p^2$ at the time of the peak current. At the peak current time the capacitor bank voltage becomes zero and the current (neglecting energy losses) is given by $I_p = V_c \sqrt{C/L}$. Once the electrical energy is transformed to an inductive energy, the discharge of the inductive energy is not subject to the rise of voltage across the metal fuel conducting element.

FIG. 1 shows a schematic representing equipment used to demonstrate the present invention. Shown is an electric circuit which provides the high energy electrical pulse power. The circuit comprises a capacitor bank 20, inductor 22, a metal fuel element (wire) 24 acting as the prime resistance component, and a fast switch 32, all of which are connect in series by an electric cable 26. The metal fuel element 24 is in contact with an oxidizer (e.g., water) 28 and both are enclosed in a reaction cell 30. A barrel 34 is connected to the wall of the reaction cell 30. A port 36 in the wall of the reaction cell 30 provides communication between the inside of the reaction cell 30 and the inside of the barrel 34. A breakable window 38 is used to seal the port 36. For experimental purposes, pressure transducers 40 and 42 in side the barrel 34 may be used instead of a projectile. Also a current bypass 44 containing a crowbar switch 46 may be connect in parallel with the metal fuel element 24 to precisely control the amount of electrical energy applied to the metal fuel element 24.

Again, in FIG. 1, the capacitor bank 20 is charged until it holds enough electrical energy to explode the metal fuel element 24 and drive the resulting molten metal fuel/water mixture to complete reaction. The energy (joules) is defined by the formula $$E = \tfrac{1}{2} C V_c^2$$

where C is the total capacitance (farads) of the capacitor bank 20 and $V_c$ is the voltage (volts) across the capacitor bank. (For convenience microfarads with kilovolts may be substituted for farads and volts in calculations.) When the fast switch 32 is closed, the electrical current of the circuit rises as the capacitor bank 20 discharges and the electrical energy is transferred to the inductor 22. During this transfer, electrical current flowing through the metal fuel element 24 heats the element 24 toward the explosion (molten metal) point.

In the preferred embodiment, when peak current ($I_p$) is reached after the fast switch 32 is closed, the energy in the capacitor bank 20 will have been transferred to the inductor 22. The energy (joules) in the inductor at this time will be $$E = \tfrac{1}{2} L I_p^2$$

where L is the inductance (henries) of the inductor 22 and $I_p$ is the peak current (amps) in the circuit. Ideally, the transfer of electrical energy from the capacitor bank 20 to the inductor 22 will be completed and the peak current achieved at the time that the metal fuel element (wire) 24 explodes (becomes molten) in the reaction cell 30. From this point on, the inductor 22 discharges and current flows through the exploding (molten) metal fuel element 24 despite the greatly increased voltage drop across the molten metal fuel element 24, adding to the energy of the molten metal fuel 24 and the water (oxidizer) 28 in the reaction cell 30. This electrical energy discharged from the inductor drives the reaction between the metal fuel and water which generates hydrogen under ever increasing pressure until the window 38 breaks and the hydrogen gas explodes from the reaction cell 30 through the port 38 into the barrel 34. The high velocity, high pressure hydrogen gas flow is used to eject a projectile from the barrel.

In the preferred embodiment, the electrical energy stored in the capacitor bank, the mass, resistance, and composition of the fuel metal element (e.g., wire), and the capacitance and the inductance of the circuit are carefully adjusted so that the peak current, $I_p$, occurs as close as is practical to the explosion of the metal fuel element. The time of the explosion is related to the electrical energy used and the properties (mass, composition, resistance) of the metal fuel element. Increasing the amount of electrical energy per unit mass of metal fuel reduces the time to explosion. Using aluminum-lithium (or aluminum-magnesium) alloy fuels instead of aluminum reduces the energy required and thus reduces the time to explosion. The geometric shape and the resistance of the metal fuel element also affect the timing of the explosion. For instance, by varying the cross-section of the metal fuel element, the resistance and thus the rate of heating to the molten state can be controlled. The time of the explosion for a given metal fuel element and electrical energy combination can be determined experimentally by monitoring the voltage drop across the metal fuel element. At the time of the explosion this voltage drop rapidly increases to a much higher value.

The time of the peak current is determined by the capacitance and inductance of the circuit. In an capacitive-inductive circuit the period (T) of the current wave is defined by $$T = 2\pi \sqrt{LC}$$

where L is the inductance and C is the capacitance of the circuit. Referring again to FIG. 1, when the fast switch 32 is closed, the charged capacitor 20 begins to discharge and the electrical current rises from zero to a maximum ($I_p$) one-quarter of the way into the cycle. Therefore, $$t_p = (1/4)T = (1/4) 2\pi \sqrt{LC} = \pi/2 \sqrt{LC}$$

where $t_p$ is the time to maximum current and L is the inductance and C is the capacitance of the circuit.

For the wire to become molten and then react completely with the water, the electrical energy must be delivered as a high power pulse in a short period of time. The total time of the high power electrical pulse is the time to peak current ($t_p$) plus the time from peak current back to zero current. The fall in current from peak back to zero occurs very rapidly and thus takes up only a small portion of the total pulse time (about 20 microseconds). The shorter the pulse time, the greater the average power level for a given amount of energy. In general, the pulse time should be less than 400 microseconds, preferably less than 300 microseconds, more preferably less than 200 microseconds, and still more preferably less than 100 microseconds.

In addition to capacitor banks, other electrical energy sources can be used to supply electrical energy to the inductor. For instance a homopolar generator can be used. A homopolar generator can be depicted to be equivalent to a capacitor. Thus its capacitance can be known and from there everything goes exactly the same as for a capacitor bank.

Batteries may also be used in place of the capacitor bank. For batteries the peak current ($I_p$) is given by $$I_p = V/R$$

and the time to peak current ($t_p$) is given by $$t_p = L(I_p/V)$$

where:

$I_p$ is the peak current;

V is the battery voltage;

R is the resistance of the batteries plus the resistance of rest of the circuit;

$t_p$ is the time to peak current; and

L is the inductance of the inductor.

For example, to get a 1 mega ampere peak current using 100 volt batteries, $R = V/I_p = (100\ v) \div (10^6\ A) = 10^{-4}$ ohms. Therefore, a very thick conductor or a superconductor has to be used to draw such a high current. Normally, a battery has abut 10 milliohms of resistance. Thus, about 100 batteries should be connected in parallel to have $10^{-4}$ ohms of resistance.

What has been described so far is the preferred embodiment in which all the energy stored in primary energy source (e.g., capacitor bank) is transferred to the inductor. That embodiment provides the most efficient use of a given device for a single launching of a projectile.

However, the only requirement for the present method to work is that sufficient electrical energy is transferred to the inductor to drive the molten metal fuel/water reaction to the desired degree of completion. For example, a capacitor bank containing 10 times the energy required for the molten metal fuel/water reaction and an inductor capable of storing more than the energy required might be used. The metal fuel element could be designed to become molten after the needed amount of electrical energy has been transferred from the capacitor bank to the inductor. Upon becoming molten, the resistance of the fuel element would rise sharply resulting in a sharp increase in the voltage drop across the element which stops the discharge of the capacitor bank. From that point on the inductor drives the current in the circuit forcing the molten metal fuel/water reaction to completion. During the process the current would not reach peak current ($I_p$) and about 90 percent of the electrical energy would be left in the capacitor bank. Yet the reaction would be forced to completion and the projectile propelled from the device. By using such a procedure a series of projectiles can be launched before the primary energy source capacitor bank requires recharging.

Figure 2:
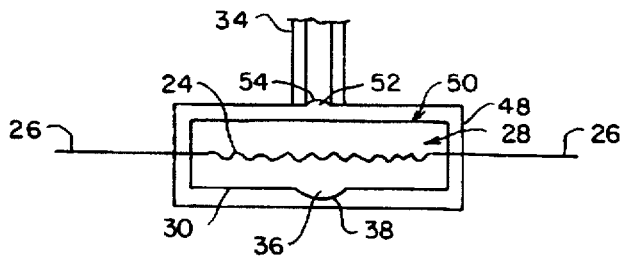
FIG. 2 shows a modification to the reaction container of the equipment in FIG. 1.

FIG. 2 shows a schematic of a modification to the reactor portion of the apparatus of FIG. 1. In FIG. 2 the metal fuel element 24 is connected to the electrical circuit by electrical cable 26 as before. The metal fuel element 24 is also in contact with water 28 and enclosed in a reaction container 30 which has a port 36 in its outer wall. The port 36 is covered and sealed by a breakable window 38. The apparatus is modified by enclosing the reaction container 30 by an outer container 48 such that a space or empty chamber 50 is formed by the outer wall of the reaction container 30 and the inner wall of the outer container 48. The outer container 50 is connected to a barrel 34 and a port 52 through the wall of the outer container 50 provides communication between the chamber 50 and the inside of the barrel 34 for the gas flow. A membrane 54 seals the port 52. In operation, the explosion of the metal fuel element (wire) 24 is accompanied by a shock wave that is of electrical origin. This shock wave can break the window 38, allowing the reactants to be prematurely forced from the reaction cell 30. In the apparatus shown in FIG. 1, the reactants will be force directly into the barrel 34. However, in the apparatus shown in FIG. 2, the reactants are forced into the chamber 50 at the side of the reaction container 30 away from port 52, membrane 54, and the barrel 34. The reaction continues in the chamber 50 until sufficient hydrogen pressure has been generated to break the membrane 54 and allow the gases to pass through port 52 into the barrel 34. This embodiment is preferred because it prevents the premature release of the hydrogen into the barrel 34 whenever an electric shock causes the premature breakage of the window 38.

Figure 3:
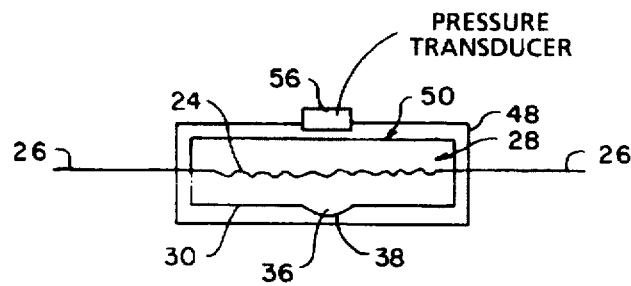
FIG. 3 shows the reaction container of FIG. 2 in which the barrel has been replaced by a pressure transducer.

FIG. 3 shows a modification of the apparatus of FIG. 2 in which the barrel 34 and membrane 54 (see FIG. 2) are replaced by pressure transducer 56 which is used to measure the hydrogen pressure in chamber 50 (see FIG. 3). The apparatus of FIG. 3 is used for testing and evaluation.

Referring to FIG. 1, the reaction container 30, metal fuel element 24, water 28, port 36, and breakable window (or membrane) 38 can be in the form of a replaceable cartridge which is loaded into a device containing the remaining elements of FIG. 1. Similarly, referring to FIG. 2 the replaceable cartridge may also be designed to contain the fuel element 24, water 28, reaction container 30, port 36, breakable window 38, outer container 48, with chamber 50, port 52, and pressure membrane 54.

In a specific embodiment of the cartridge, the powder of a convention shell is replaced with a metal fuel element and water. The weight and volume of the metal fuel and water are less than that of the powder which is replaced. An electrical contact at the bottom end of the shell is connected to one end of the metal fuel element and the other end of the element is connected to the metal case of the cartridge which acts as the electrical return. When the cartridge is fired, high temperature, high pressure hydrogen gas is generated to propel the bullet from the cartridge at high velocity.

Finally, in the process of this invention, only a few percent (10%) of the electrical energy is used to melt the metal fuel element. The remaining 90% of the electrical energy is delivered from the inductor to the molten metal fuel/water mixture to drive the reaction to completion. Examples 1 and 2 provide guidance as to the amount of electrical energy required. From 8 to 12 kJ/g more preferably from 10 to 11 kJ/g is used with aluminum as the metal fuel. Less energy is required when Al—Li or Al—Mg alloys are used. The optimal energy require for a metal fuel element of a given composition, and weight can easily be determined by the experimental procedures of examples 1 and 2. Electrical energy in excess of the amount required to drive the reaction is simply wasted. If a very large excess of electrical energy is used, arcing may occur.

To more clearly illustrate this invention, the following examples are presented. It should be understood, however, that these examples are presented merely as a means of illustration and are not intended to limit the scope of this invention in anyway.

EXAMPLE 1

The oxidation reaction of aluminum with water was triggered by allowing an electrical current pulse to pass through an aluminum (Al) or an aluminum-lithium (Al—Li) alloy (2.5 wt % Li) wire in a stoichiometrical excess of water. The wire was 6 cm long, 0.056 cm in diameter, and weighed 50 mg. The wire 24 was placed in a circuit arrangement as shown in FIG. 1. The capacitor bank 20 had a total capacitance of $3 \times 10^{-4}$ farads and the inductor 22 had an inductance of $5 \times 10^{-6}$ heneries. The electrical energy deposited in the wire 24 was adjusted to be from 2 to 11 kJ per gram of wire by adjusting the capacitor bank 20 voltage. The reactor arrangement shown in FIG. 3 was used. The Al or Al—Li alloy wire 24 was connected to the electrical circuit by electrical cable 26. The wire 24 was in contact with the water 28 and both were enclosed in the reaction cell 30. The reaction cell 30 was enclosed in an outer container 48 with a chamber 50 being defined by the outer wall of the reaction container 30 and the inner wall of the outer container 48. A port 36, sealed by a breakable window 38, provides a path for the hydrogen produced by the reactin to pass from the reaction container 30 to the chamber 50. A pressure transducer 56 monitored the hydrogen gas pressure in the chamber 50. The test results are presented in table 1.

TABLE 1

| Sample[1] Wire | Bank Voltage (kV) | Dissipated Energy (kJ/g) | Hydrogen Generated (millimoles) | Chemical Conversion (%) |
|---|---|---|---|---|
| Al | | 2.3 | | 17 |
| Al | | 3.7 | | 39 |
| Al | | 5.9 | | 84 |

TABLE 1-continued

| Sample[1] Wire | Bank Voltage (kV) | Dissipated Energy (kJ/g) | Hydrogen Generated (millimoles) | Chemical Conversion (%) |
|---|---|---|---|---|
| Al |  | 8.0 |  | 100 |
| Al—Li |  | 2.6 |  | 40 |
| Al—Li |  | 3.5 |  | 70 |
| Al—Li |  | 5.6 |  | 94 |
| Al—Li |  | 11.0 |  | 100 |

[1]Al is aluminum containing no lithium.
Al—Li is an aluminum-lithium alloy containing 2.5 weight percent of lithium.

EXAMPLE 2

Referring to FIG. 1, the electrical energy deposited in the wire 24 was adjusted to be from 2 to 10 kJ per gram of wire by varying the duration of current flow through the wire 24 at a fixed bank voltage at the capacitor 20, 3.0 kV for Al wire and 2.5 kV for Al—Li wire. The duration of current flow was adjusted by closing the crowbar switch 46 at a certain time after the fast switch 32 is closed. The closing of the crowbar switch 46 provides a current bypass around the wire 24 so that little current is allowed to pass through it. Precise control for closing of the crowbar switch 46 is normally accomplished by using an explosive. The duration of current flow in each test is indicated in Table 2.

TABLE 2

| Sample Wire | Bank Voltage (kV) | Duration of Current Flow (micro sec) | Disspated (kJ/g) | Chemical Conversion (%) |
|---|---|---|---|---|
| Al | 3.0 | 92 | 2.2 | 20 |
| Al | 3.0 | 100 | 3.7 | 44 |
| Al | 3.0 | 103 | 5.2 | 73 |
| Al | 3.0 | 107 | 7.5 | 92 |
| Al | 3.0 | 110 | 10.4 | 100 |
| Al—Li | 2.5 | 81 | 2.1 | 0 |
| Al—Li | 2.5 | 92 | 2.7 | 66 |
| Al—Li | 2.5 | 95 | 4.1 | 90 |
| Al—Li | 2.5 | 98 | 6.8 | 96 |

Capacitance = $3 \times 10^{-4}$ farads
Inductance = $1 \times 10^{-5}$ henries.

EXAMPLE 3

A mechanical agitation was imposed to an exploding Al wire by letting another Al wire nearby (0.8 cm away from the main wire) explode and the shock wave from the explosion hit the main wire at a desired time. It turned out that the chemical reactivity of the main wire was increased by 50% when its dispersion was assisted by the agitation. Thus, by using this kind of agitating technique a reduced amount of electrical energy is needed to achieve the same degree of chemical reaction.

EXAMPLE 4

Projectile Launcher

A small test assembly comprising a steel breech block, rifle barrel, aluminum/water filled Lucite cartridge, and a 10 gram lead bullet were assembled and fired to demonstrate capability of a electro-chemically driven projectile launcher.

The breech block (pressure housing) was made by drilling and tapping a ¾ inch diameter×3 inch deep hole into a steel cylinder which had 4 inch outside diameter and was 6 inches long. Provisions were made to provide a high current electrical feed-through from outside into the breech cartridge chamber. Electrical return path was through the steel housing.

The explosive cartridge was made by coiling a 6 inch long 16 gauge aluminum wire and immersing it in water in a 7/16 inch diameter by 3¼ inch deep hole which had been bored into a ¾ inch diameter by 4 inch long Lucite cylinder. This cartridge was installed in the breech block with one end of the wire in electrical contact to the high current feed through and the other end connected to the steel breech block at the point where the rifle barrel is installed. A thin (1/16 inch thick) aluminum disc containing a machined circle to permit rapid break away for pressure release, was used to seal the breech block and separate it from a 10 gram lead projectile located in the barrel breech.

The electrical power source used to drive the aluminum/water chemical reaction consists of a $300 \times 10^{-6}$ farad capacitor charged to 5.8 kV and discharged into the test cartridge by means of an over-voltage spark gap switch. Electrical energy stored is typically 4 kJ, which is the electrical equivalent to the energy contained in a 1 gram (approximate) propellant charge.

A target, made of ⅛ inch thick 6061 T6 aluminum plate was positioned at ½ meter beyond the barrel muzzle.

In test firings, the electrical discharge was initiated and sustained until the aluminum/water reaction was well underway and pressure in the breech block exceeded the breakaway pressure needed to rupture the sealing disc. The released pressure accelerated the 10 gram had projectile down the barrel and penetrated and passed through the aluminum target, leaving a clean hole. It eventually impacted a cement wall, producing a crater ¼ in deep by 1 inch diameter. A comparison of the target impact with that produced by a conventional shot using a similar projectile propelled by a 3 gram (approximately) powder charge gives a very crude indication that the projectile attained a velocity of approximately 2000 ft./sec.

Obviously, numerous modifications and variations of the present invention are possible in light of the above teachings. It is therefore to be understood that within the scope of the appended claims the invention may be practiced otherwise than as specifically described herein.

What is claimed is:

1. A method of propelling a projectile from a device comprising:
   (1) applying a high power pulse of electrical current to a metal fuel element causing the element to explode dispersing molten metal fuel into water surrounding the metal fuel element where the molten metal reacts with the water to generate hydrogen at high pressure in a chamber, wherein
      (a) the metal fuel is selected from the group consisting of (i) aluminum, (ii) an aluminum-lithium alloy comprising from more than zero to 3.0 weight percent of lithium with the remainder of the alloy being essentially aluminum, and (iii) an aluminum-magnesium alloy comprising from more than zero to 5.0 weight percent of magnesium with the remainder of the alloy being essentially aluminum;
   and wherein
      (b) after the metal fuel has become molten, electrical current is supplied from an inductive electrical energy source to drive the reaction between the molten metal fuel and the water;

(2) allowing the hydrogen gas pressure in the chamber to build to a preselected level; and then (3) using the hydrogen gas to push the projectile from the device.

2. The method of claim 1 wherein the metal fuel is aluminum.

3. The method of claim 1 wherein from 100 to 1000 percent of the stoichiometric amount of water needed to react with the metal fuel is present.

4. The method of claim 3 wherein from 150 to 300 percent of the stoichiometric amount of water needed to react with the metal fuel is present.

5. The method of claim 1 wherein the electrical pulse is less than 400 microseconds long.

6. The method of claim 5 wherein the electrical pulse is less than 200 micoseconds long.

7. The method of claim 6 wherein the electrical pulse is less than 100 microseconds long.

8. A method of propelling a projectile from a device comprising:

(1) applying a high power pulse of electrical current to a metal fuel element causing the element to explode dispersing molten metal fuel into water surrounding the metal fuel element where the molten metal reacts with the water to generate hydrogen at high pressure in a chamber, wherein (a) the metal fuel is an aluminum-lithium alloy comprising from more than zero to 3.0 weight percent of lithium with the remainder of the alloy being essentially aluminum, and wherein (b) after the metal fuel has become molten, electrical current is supplied from an inductive electrical energy source to drive the reaction between the molten metal fuel and the water;

(2) allowing the hydrogen gas pressure in the chamber to build to a preselected level; and then (3) using the hydrogen gas to push the projectile from the device.

9. The method of claim 8, wherein the aluminum-lithium alloy comprises from 2.0 to 2.8 weight percent of lithium.

10. The method of claim 9 wherein the aluminum-lithium alloy comprises from 2.5 to 2.8 weight percent.

11. A method of propelling a projectile from a device comprising:

(1) applying a high power pulse of electrical current to a metal fuel element causing the element to explode dispersing molten metal fuel into water surrounding the metal fuel element where the molten metal reacts with the water to generate hydrogen at high pressure in a chamber, wherein (a) the metal fuel is an aluminum-magnesium alloy comprising from more than zero to 5.0 weight percent of magnesium with the remainder of the alloy being essentially aluminum, and wherein (b) after the metal fuel has become molten, electrical current is supplied from an inductive electrical energy source to drive the reaction between the molten metal fuel and the water;

(2) allowing the hydrogen gas pressure in the chamber to build to a preselected level; and then (3) using the hydrogen gas to push the projectile from the device.

12. The method of claim 11 wherein the aluminum-magnesium alloy comprises from 3.0 to 4.5 weight percent of magnesium.

* * * * *